United States Patent [19]
Ide et al.

[11] Patent Number: 5,100,700
[45] Date of Patent: Mar. 31, 1992

[54] INFORMATION RECORDING MEDIUM

[75] Inventors: Yukio Ide, Mishima; Makoto Harigaya, Hiratsuka; Katsuyuki Yamada, Yokohama; Hiroko Iwasaki, Tokyo, all of Japan

[73] Assignee: Ricoh Company, Ltd., Tokyo, Japan

[21] Appl. No.: 485,991

[22] Filed: Feb. 27, 1990

[30] Foreign Application Priority Data

Mar. 10, 1989 [JP] Japan .................................. 1-56189
Mar. 28, 1989 [JP] Japan .................................. 1-73896

[51] Int. Cl.$^5$ .............................................. B32B 3/00
[52] U.S. Cl. .................................... 428/64; 428/65; 428/913; 369/283; 369/288; 346/76 L; 346/135.1
[58] Field of Search .......................... 428/64, 65, 913; 369/283, 288; 346/76 L, 135.1

[56] References Cited

U.S. PATENT DOCUMENTS

| | | | |
|---|---|---|---|
| 4,513,071 | 4/1985 | Mey | 430/126 |
| 4,939,013 | 7/1990 | Kimura et al. | 428/64 |
| 4,954,379 | 9/1990 | Nishida et al. | 428/64 |
| 5,011,723 | 4/1991 | Harigaya et al. | 428/64 |

*Primary Examiner*—Patrick J. Ryan
*Assistant Examiner*—Elizabeth Evans
*Attorney, Agent, or Firm*—Cooper & Dunham

[57] ABSTRACT

An information recording medium comprising a substrate, and a recording layer formed thereon, which comprises as the main component a compound having the following formula:

$$(X_a Y_b Z_c)_{1-d} O_d$$

wherein X is an element selected from the group consisting of the elements belonging to the Ib group and IVb group in the periodic table, Y is an element selected from the group consisting of the elements belonging to the Vb group in the periodic table, Z is an element selected from the group consisting of the elements belonging to the VIb group in the periodic table, and a, b, c, and d fulfill the following conditions:

$$0.05 \leq a \leq 0.35,$$

$$0.10 \leq b \leq 0.40,$$

$$0.40 \leq c \leq 0.60,$$

$$a+b+c=1, \text{ and}$$

$$0.05 \leq d \leq 0.20.$$

10 Claims, 1 Drawing Sheet

INFORMATION RECORDING MEDIUM

BACKGROUND OF THE INVENTION

1. Field of the Invention

This invention relates to an information recording medium, and more particulary to a phase-change-type information recording medium applicable to optical memory-related devices, which comprises a specific phase-changeable compound in its recording layer.

2. Discussion of Background

A phase-change-type information recording medium is now very popular in the field of optical information recording. The recording medium of this type utilizes a change between a crystalline phase and an amorphous phase, or between two crystalline phases of a material of the recording layer. Such a change between two different phases occurs when electromagnetic waves, in particular laser beams, are applied to the recording medium. Information recording, reproduction and overwriting can thus be achieved.

On the phase-change-type information recording medium, information can be overwritten by applying a single beam. Moreover, the recording medium of this type does not require a complicated optical system on the driving side. For these reasons, research and development of such a recording medium is extensively being made these days.

Thin films of Ge-Te, Ge-Te-S, Ge-Se-S, Ge-Se-Sb, Ge-As-Se, In-Te, Se-Te and Se-As, disclosed in U.S. Pat. No. 3,530,441, are known as typical chalcogen alloy thin films usable as the recording layer of the phase-change-type information recording medium.

In addition, aiming at improving the stability and achieving high-speed crystallization, the following proposals have been made so far. Namely, a Ge-Te alloy thin film containing Au, as disclosed in Japanese Laid-Open Patent Application 61-219692, a Ge-Te alloy thin film containing both Sn and Au, as disclosed in Japanese Laid-Open Patent Application 61-270190, and a Ge-Te alloy thin film containing Pb, as disclosed in Japanese Laid-Open Patent Application 62-19490.

In order to obtain an improved recording medium which can withstand repeated information recording and erasing, a material composed of Ge, Te, Se and Sb with a specific composition ratio has also been proposed in Japanese Laid-Open Patent Application 62-73438.

None of the above recording media, however, has all the characteristics required for a phase-change-type rewritable optical information recording medium. The remaining problems to be solved are improvement of the recording and erasing sensitivities, prevention of lowering of the erasion ratio, which is caused due to incomplete erasion at the time of overwriting, and prolongation of the expected life span of a non-recorded area.

SUMMARY OF THE INVENTION

Accordingly, an object of the present invention is to provide an information recording medium which is free from the above-described drawbacks in the conventional information recording media, and has improved characteristics such as a high erasing speed (high crystallization speed), a prolonged life span of a recording area (amorphous area), high reliability (high oxidation and corrosion resistances), and high mechanical strength.

The above object of the present invention can be attained by an information recording medium comprising a substrate, and a recording layer formed thereon, which comprises as the main component a compound having the formula of:

$$(X_a Y_b Z_c)_{1-d} O_d$$

wherein X is an element selected from the group consisting of the elements belonging to the Ib group and IVb group in the periodic table, Y is an element selected from the group consisting of the elements belonging to the Vb group in the periodic table, Z is an element selected from the group consisting of the elements belonging to the VIb group in the periodic table, and a, b, c, and d fulfill the conditions of:

$$0.05 \leq a \leq 0.35,$$

$$0.10 \leq b \leq 0.40,$$

$$0.40 \leq c \leq 0.60,$$

$$a+b+c=1, \text{ and}$$

$$0.05 \leq d \leq 0.20.$$

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
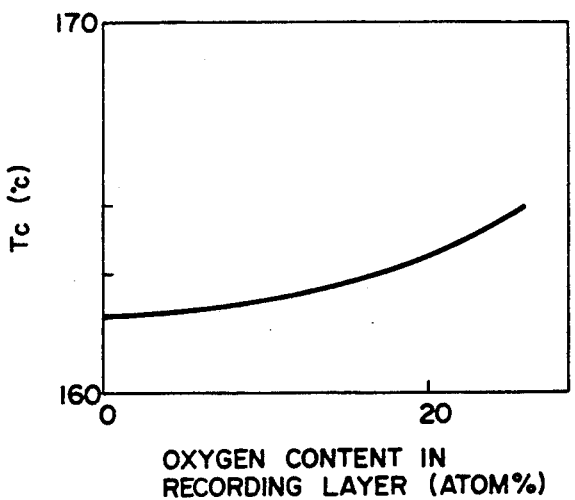
FIG. 1 is a graph showing the relationship between the oxygen content in the recording layer of the recording medium according to the present invention and the crystallization temperature (Tc) thereof.

In general, the erasing speed of information recorded in a phase-change-type information recording medium, and the life span of the recording area are characterized by both the activation energy (Ea) required for the phase transition, and the frequency factor ($v$).

The relationship between the activation energy (Ea) and the frequency factor ($v$) is expressed by the following Arrhenius' equation:

$$k = v \, exp \, (-Ea/k_B T)$$

wherein k is the rate constant of crystallization reaction, $k_B$ is the Boltzmann's constant, and T is an absolute temperature.

In the case where an amorphous area and a crystalline area correspond to a recording area and a non-recording area respectively, the erasing speed can be increased by increasing the value of k under a temperature higher than the crystallization temperature (Tc), and the life span of the recorded area can be prolonged by decreasing the value of k under room temperature. The relationship between Ea and $\nu$ in terms of k can be obtained in the following way.

$$\partial k = \exp(-E_a/k_BT) \cdot \partial \nu + \nu(-E_a/k_BT) \cdot \exp(-E_a/k_BT) \cdot \partial E_a$$
$$= \exp(-E_a/k_BT) \cdot \{\partial \nu - \nu/k_BT \cdot \partial E_a\}$$
$$\therefore |\partial k/k| = |\partial \nu/\nu| - E_a/k_BT |\partial E_a/E_a|$$

As the above final equation shows, $\nu$ greatly contributes to the value of k when the temperature (T) is high; and both Ea and $\nu$ contribute to the value of k when the temperature (T) is low. Therefore, in order to improve both the erasing speed and the life span of the recorded area, it is necessary to employ a material having high Ea and high $\nu$ as a recording layer.

It was found that high Ea and high $\nu$ can be attained by incorporating oxygen into a material conventionally used for a recording layer. The present invention has been accomplished on the basis of the above finding.

Namely, an information recording medium according to the present invention comprises a substrate, and a recording layer formed thereon, comprising as a main component a compound having the following formula:

$$(X_aY_bZ_c)_{1-d}O_d$$

wherein X is an element selected from the group consisting of the elements belonging to the Ib group and the IVb group in the periodic table, Y is an element selected from the group consisting of the elements belonging to the Vb group in the periodic table, Z is an element selected from the group consisting of the elements belonging to the VIb group in the periodic table, and a, b, c, and d fulfill the following conditions:

$0.05 \leq a \leq 0.35$, $0.10 \leq b \leq 0.40$, $0.40 \leq c \leq 0.60$, $a+b+c=1$, and $0.05 \leq d \leq 0.20$.

When the content of the element X indicated by a is less than 5 atom %, both the activation energy (Ea) and the frequency factor ($\nu$) become small. As a result, the crystallization speed is decreased, and the life span of the recorded area amorphous area) is shortened. On the other hand, when the content of the element X exceeds 35 atom %, the activation energy (Ea) becomes too large to attain high-speed crystallization.

When the content of the element Y indicated by b is less than 10 atom %, the crystallization speed is decreased, and when it exceeds 40 atom %, the contrast between the recorded area and the non-recording area becomes small.

When the content of the element Z indicated by c is less than 40 atom %, the contrast between the recorded area and the non-recorded area becomes small, and when it is more than 60 atom %, the life span of the recording area (amorphous area) is shortened.

When the content of oxygen indicated by d is less than 5 atom %, the aimed effects cannot be obtained. On the other hand, when the oxygen content exceeds 20 atom %, the contrast between the recorded area and the non-recorded area becomes small.

In the case where X is an element selected from the group consisting of the elements belonging to the Ib group, it is preferable that a, b, c and d fulfill the following conditions from the viewpoints of thermal stability, the life span of the recorded area, and the erasing speed:

$0.15 \leq a \leq 0.35$, $0.15 \leq b \leq 0.35$, $0.40 \leq c \leq 0.60$, $a+b+c=1$, and $0.05 \leq d \leq 0.20$.

Typical examples of the compounds of this type are as follows:

$(Ag_aSb_bTe_c)_{1-d}O_d$, $(Ag_aBi_bTe_c)_{1-d}O_d$, $(Ag_aSb_bSe_c)_{1-d}O_d$, $(Cu_aSb_bTe_c)_{1-d}O_d$, $(Ag_aSb_bS_c)_{1-d}O_d$, $(Ag_aBi_bSe_c)_{1-d}O_d$, $(Ag_aBi_bS_c)_{1-d}O_d$, $(Cu_aSb_bSe_c)_{1-d}O_d$, $(Cu_aSb_bS_c)_{1-d}O_d$, $(Cu_aBi_bSe_c)_{1-d}O_d$, $(Cu_aBi_bS_c)_{1-d}O_d$, $(Ag_aAs_bTe_c)_{1-d}O_d$, $(Ag_aAs_bSe_c)_{1-d}O_d$, $(Ag_aAs_bS_c)_{1-d}O_d$,

When X is an element selected from the group consisting of the elements belonging to the IVb group, it is preferable that a, b, c, and d fulfill the following conditions from the viewpoints of thermal stability, the life span of the recorded area, and the erasing speed:

$0.05 \leq a \leq 0.30$, $0.10 \leq b \leq 0.40$, $0.40 \leq c \leq 0.60$, $a+b+c=1$, and $0.05 \leq d \leq 0.20$.

The most preferable compound of this type is a compound composed of Ge, Sb, Te and O.

The recording layer of the present invention is formed by any one of the known gas phase film-forming methods such as vacuum deposition, electron beam vacuum deposition, sputtering, chemical vapor deposition and ion plating. The recording layer is either a single layer or a plurality of layers.

In addition, a layer prepared by dispersing the compound having the above formula in a heat-resistant matrix is also acceptable as the recording layer. In this case, a wet-type process such as a sol-gel method can be employed besides the gas phase film-forming method.

The thickness of the recording layer is 200 to 10,000 Å, more preferably 500 to 3,000 Å, and most preferably 700 to 2,000 Å.

A plate of glass, ceramics or a resin is used as a substrate of the recording medium according to the present invention. Of the above materials, resins are the most preferable when the molding properties and the production cost are taken into consideration.

Typical examples of the resins usable as the substrate include a polycarbonate resin, an acrylic resin, an epoxy resin, a polystyrene resin, an acrylonitrile-styrene copolymer resin, a polyethylene resin, a polypropylene resin, a silicone resin, a fluorine-contained resin, an ABS resin, and an urethane resin. Of these, a polycarbonate resin and an acrylic resin are preferred from the view points of the processing and optical properties.

A substrate in any shape such as of a disc, a card and a sheet can be employed in the present invention.

Auxiliary layers such as a heat-resistant protective layer, a surface protective layer, a light-reflective layer and an adhesive layer may be formed in the recording medium of the present invention, if necessary.

A typical structure of the recording medium is such that a substrate, a lower heat-resistant protective layer, a recording layer, an upper heat-resistant protective layer, a light-reflective layer, an adhesive layer and a surface protective layer are overlaid in this order.

Specific examples of the material for the heat-resistant protective layer include metal oxides such as SiO, $SiO_2$, ZnO, $SnO_2$, $Al_2O_3$, $TiO_2$, $In_2O_3$, MgO and $ZrO_2$, nitrides such as $Si_3N_4$, AlN, TiN, BN and ZrN, carbides such as SiC, TaC, $B_4C$, WC, TiC and ZrC, diamond-like carbon, and mixtures thereof. If necessary, the above material may contain some impurities.

The heat-resistant protective layer can be formed by any one of the known gas phase film-forming methods such as vacuum deposition, sputtering, plasma chemical vapor deposition, photochemical vapor deposition, ion plating and electron beam vacuum deposition.

The thickness of the heat-resistant protective layer is 200 to 5,000 Å, preferably 500 to 3,000 Å, when the functions as a protective layer, the sensitivity and exfoliation at the interface between the protective layer and other layers are taken into consideration. Moreover, if necessary, the protective layer may be composed of a plurality of layers.

Other features of this invention will become apparent in the course of the following description of exemplary embodiments, which are given for illustration of the invention and are not intended to be limiting thereof.

EXAMPLE 1

A recording layer was formed on a glass substrate by sputtering using an $AgSbTe_2$-type alloy as a target under the following conditions:

| | |
|---|---|
| Substrate temperature: | room temperature |
| Electric power supplied: | 50 W, 13.56 MHz |
| Pressure: | 10 Pa |
| Flow rate of carrier gasses $O_2$/Ar: | 0.35/10 |
| Sputtering time: | 2 minutes. |

Thus, information recording medium No. 1 according to the present invention was prepared.

The composition of the above recording layer was determined by the Auger electron spectroscopy. The crystallization temperature (Tc) of the recording layer was measured by a differential scanning calorimeter, and the activation energy (Ea) and the frequency factor ($v$) were obtained by calculation. The results are shown in Table 1.

The reflectivities of the recording medium before and after the thermal treatment at 200° C. for 10 minutes were measured by a spectrophotometer by applying a light having a wavelength of 800 nm, and the difference between these two reflectivities ($\Delta R\%$) was obtained by calculation. The result is shown in Table 1.

EXAMPLE 2

A recording layer was formed on a glass substrate by sputtering using an $AgSbTe_2$-type alloy as a target under the following conditions:

| | |
|---|---|
| Substrate temperature: | room temperature |
| Electric power supplied: | 50 W, 13.56 MHz |
| Pressure: | 10 Pa |
| Flow rate of carrier gasses $O_2$/Ar: | 0.7/10 |
| Sputtering time: | 2 minutes. |

Thus, information recording medium No. 2 according to the present invention was prepared.

The composition, Tc, Ea, $v$ and $\Delta R\%$ of the recording layer were determined by the same methods as in Example 1.

EXAMPLE 3

A recording layer was formed on a glass substrate by sputtering using an $AgSbTe_2$-type alloy as a target under the following conditions:

| | |
|---|---|
| Substrate temperature: | room temperature |
| Electric power supplied: | 50 W, 13.56 MHz |
| Pressure: | 10 Pa |
| Flow rate of carrier gasses $O_2$/Ar: | 1.0/10 |
| Sputtering time: | 2 minutes. |

Thus, information recording medium No. 3 according to the present invention was prepared.

The composition, Tc, Ea, $v$ and $\Delta R\%$ of the recording layer were determined by the same methods as in Example 1.

COMPARATIVE EXAMPLE 1

A recording layer was formed on a glass substrate by sputtering using an $AgSbTe_2$-type alloy as a target under the following conditions:

| | |
|---|---|
| Substrate temperature: | room temperature |
| Electric power supplied: | 50 W, 13.56 MHz |
| Pressure: | 10 Pa |
| Flow rate of carrier gasses $O_2$/Ar: | 0/10 |
| Sputtering time: | 2 minutes. |

Thus, comparative information recording medium No. 1 was prepared.

The composition, Tc, Ea, $\nu$ and $\Delta R\%$ of the recording layer were determined by the same methods as in Example 1.

COMPARATIVE EXAMPLE 2

A recording layer was formed on a glass substrate by sputtering using an $AgSbTe_2$-type alloy as a target under the following conditions:

| | |
|---|---|
| Substrate temperature: | room temperature |
| Electric power supplied: | 50 W, 13.56 MHz |
| Pressure: | 10 Pa |
| Flow rate of carrier gasses $O_2/Ar$: | 2.0/10 |
| Sputtering time: | 2 minutes. |

Thus, comparative information recording medium No. 2 was prepared.

The composition, Tc, Ea, $\nu$ and $\Delta R\%$ of the recording layer were determined by the same methods as in Example 1.

TABLE 1

| Composition of Recording Layer | Tc (°C.) | Ea (eV) | $\nu$ (1/Sec) | $\Delta R$ (%) |
|---|---|---|---|---|
| Example 1 | $(Ag_{0.18}Sb_{0.26}Te_{0.56})_{0.94}O_{0.06}$ | 135 | 2.03 | $7.0 \times 10^{23}$ | 18 |
| Example 2 | $(Ag_{0.20}Sb_{0.28}Te_{0.52})_{0.90}O_{0.10}$ | 142 | 2.30 | $4.3 \times 10^{24}$ | 16 |
| Example 3 | $(Ag_{0.22}Sb_{0.26}Te_{0.52})_{0.84}O_{0.16}$ | 148 | 2.52 | $4.5 \times 10^{25}$ | 13 |
| Comp. Example 1 | $(Ag_{0.20}Sb_{0.25}Te_{0.55})_{0.99}O_{0.01}$ | 128 | 1.80 | $5.6 \times 10^{22}$ | 18 |
| Comp. Example 2 | $(Ag_{0.26}Sb_{0.24}Te_{0.50})_{0.70}O_{0.30}$ | 156 | 2.70 | $7.2 \times 10^{25}$ | $-3$ |

The above-prepared recording media Nos. 1, 2 and 3 according to the present invention and comparative recording media Nos. 1 and 2 were allowed to stand at 60° C. and 90% RH for 500 hours. Thereafter, the reflectivity of each recording medium was measured, and was compared with the reflectivity before the above treatment. As a result, it was found that the difference between these two reflectivities of recording media Nos. 1 to 3 according to the present invention and comparative recording medium No. 2 was only 3% or less, but that of comparative recording medium No. 1 was more than 5%.

Comparative recording medium No. 2 showed a small difference between the contrasts before and after the above treatment.

The recording media Nos. 1 to 3 according to the present invention and comparative recording medium No. 2 were hardly scratched, while comparative recording medium No. 1 was easily scratched. It was thus confirmed that the recording media comprising oxygen in its recording layer had improved mechanical strength.

EXAMPLE 4

A recording layer was formed on a glass substrate by sputtering using $Ge_2Sb_2Te_5$ as a target and a mixture of argon and oxygen as a carrier gas.

Thus, information recording medium No. 4 according to the present invention was prepared.

The composition of the above recording layer was determined by the Auger electron spectroscopy. The crystallization temperature (Tc) of the recording layer was measured by a differential scanning calorimeter, and the activation energy (Ea) and the frequency factor ($\nu$) were obtained by calculation. The reflectivity of the recording medium was also measured by a spectrophotometer by applying a light having a wavelength of 830 nm. The results are shown in FIGS. 1, 2 and 3.

FIG. 1 is a graph showing the relationship between the oxygen content (atom %) in the recording layer and the crystallization temperature (Tc). This graph demonstrates that the crystallization temperature rises with the increase of the oxygen content.

Figure 2:
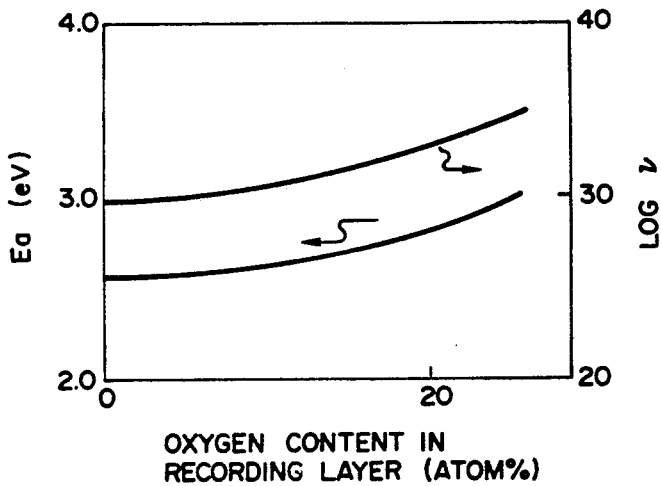
FIG. 2 is a graph showing the relationship between the oxygen content in the recording layer of the recording medium according to the present invention and the activation energy (Ea) thereof, and the relationship between the oxygen content and the frequency factor ($v$)
Figure 3:
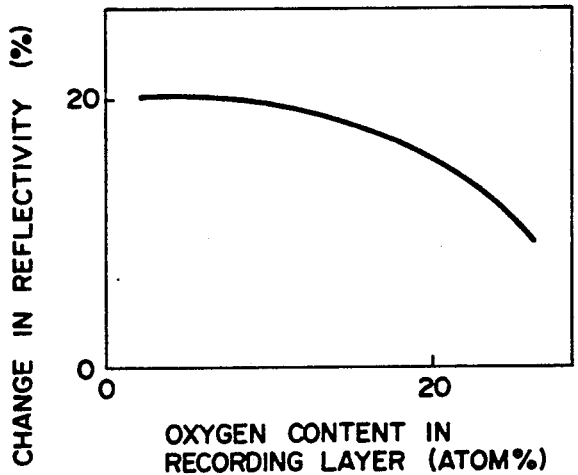
FIG. 3 is a graph showing the relationship between the oxygen content in the recording layer of the recording medium according to the present invention and the contrast between the recorded and the non-recorded areas thereof.

FIG. 2 is a graph showing the relationships between the oxygen content and the activation energy (Ea), and between the oxygen content and the frequency factor ($\nu$). This graph shows that both Ea and $\nu$ become high with the increase of the oxygen content.

It can be known from these two graphs that Tc, Ea and $\nu$ are remarkably improved when the oxygen content in the recording layer is 5 atom % or more.

FIG. 3 is a graph showing the relationship between the oxygen content and the contrast between the recorded area and the non-recorded area. This graph demonstrates that the contrast becomes small when the oxygen content exceeds 20 atom %.

As described above, the recording media according to the present invention have the following improved characteristics:

1. High erasing speed: it can be attained by increasing the frequency factor of the recording layer.
2. Long life span of the recorded area: it can be attained by increasing the activation energy.
3. High oxidization and corrosion resistances.
4. High mechanical strength.

What is claimed is:

1. An information recording medium comprising a substrate, and a recording layer formed thereon, which comprises as the main component a compound having the formula of:

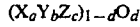

$$(X_aY_bZ_c)_{1-d}O_d$$

wherein X is an element selected from the group consisting of the elements belonging to the Ib group and IVb group in the periodic table, Y is an element selected from the group consisting of the elements belonging to the Vb group in the periodic table, Z is an element selected from the group consisting of the elements belonging to the VIb group in the periodic table, and a, b, c, and d fulfill the conditions of:

$0.05 \leq a \leq 0.35,$ $0.10 \leq b \leq 0.40,$ $0.40 \leq c \leq 0.60,$ $a+b+c=1,$ and $0.05 \leq d \leq 0.20.$ 2. The information recording medium as claimed in claim 1, wherein said compound comprised in said recording layer has the formula of:

$$(X_aY_bZ_c)_{1-d}O_d$$

wherein X is an element selected from the group consisting of the elements belonging to the Ib group in the periodic table, and a, b, c, and d fulfill the conditions of:

$0.15 \leq a \leq 0.35$, $0.15 \leq b \leq 0.35$, $0.40 \leq c \leq 0.60$, $a+b+c=1$, and $0.05 \leq d \leq 0.20$.

3. The information recording medium as claimed in claim 1, wherein said compound comprised in said recording layer has the formula of:

$$(X_aY_bZ_c)_{1-d}O_d$$

wherein X is an element selected from the group consisting of the elements belonging to the IVb group in the periodic table, and a, b, c, and d fulfill the conditions of:

$0.05 \leq a \leq 0.30$, $0.10 \leq b \leq 0.40$, $0.40 \leq c \leq 0.60$, $a+b+c=1$, and $0.05 \leq d \leq 0.20$.

4. The information recording medium as claimed in claim 2, wherein said compound comprised in said recording layer is selected from the group consisting of $(Ag_aSb_bTe_c)_{1-d}O_d$, $(Ag_aBi_bTe_c)_{1-d}O_d$, $(Ag_aSb_bSe_c)_{1-d}O_d$, $(Cu_aSb_bTe_c)_{1-d}O_d$, $(Ag_aSb_bS_c)_{1-d}O_d$, $(Ag_aBi_bSe_c)_{1-d}O_d$, $(Ag_aBi_bS_c)_{1-d}O_d$, $(Cu_aSb_bSe_c)_{1-d}O_d$, $(Cu_aSb_bS_c)_{1-d}O_d$, $(Cu_aBi_bSe_c)_{1-d}O_d$, $(Cu_aBi_bS_c)_{1-d}O_d$, $(Ag_aAs_bTe_c)_{1-d}O_d$, $(Ag_aAs_bSe_c)_{1-d}O_d$, and $(Ag_aAs_bS_c)_{1-d}O_d$.

5. The information recording medium as claimed in claim 3, wherein said X is Ge, said Y is Sb, and said Z is Te.

6. The information recording medium as claimed in claim 1, wherein the thickness of said recording layer is 200 Å to 10,000 Å.

7. The information recording medium as claimed in claim 1, wherein the material for said substrate is selected from the group consisting of glass, ceramics, and resins.

8. The information recording medium as claimed in claim 1, further comprising a heat-resistant protective layer.

9. The information recording medium as claimed in claim 8, wherein the thickness of said heat-resistant protective layer is 200 Å to 5,000 Å.

10. The information recording medium as claimed in claim 8, wherein the material for said heat-resistant protective layer is selected from the group consisting of metal oxides such as SiO, $SiO_2$, ZnO, $SnO_2$, $Al_2O_3$, $TiO_2$, $In_2O_3$, MgO and $ZrO_2$, nitrides such as $Si_3N_4$, AlN, TiN, BN and ZrN, carbides such as SiC, TaC, $B_4C$, WC, TiC and ZrC, diamond-like carbon, and mixtures thereof.

* * * * *